Aug. 28, 1956    H. L. REILLY    2,760,684
SEED SPACING DRILL
Filed April 2, 1952    3 Sheets-Sheet 1
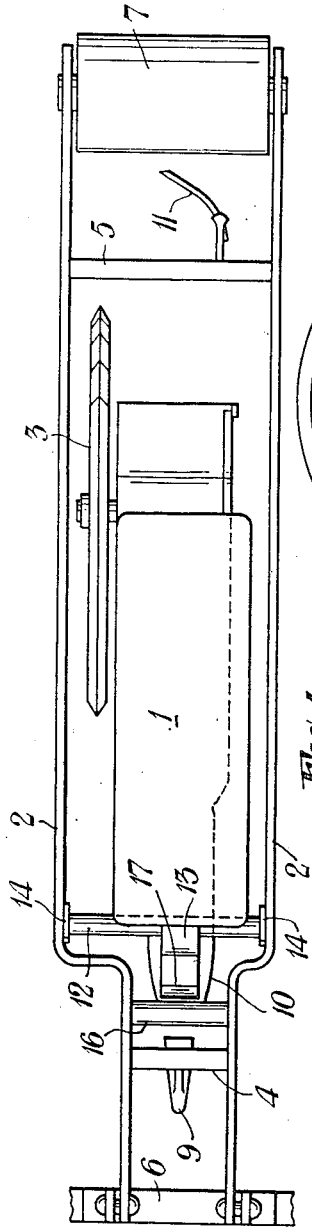
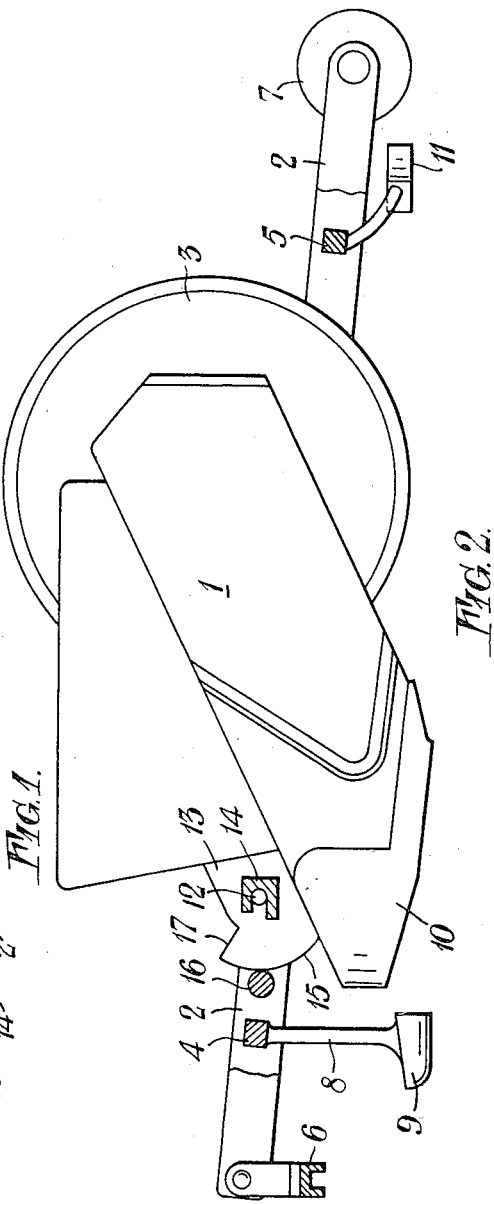
INVENTOR
Hugh Lambert Reilly
BY
Johnson and Kline
ATTORNEYS Aug. 28, 1956　　　H. L. REILLY　　　2,760,684
SEED SPACING DRILL
Filed April 2, 1952　　　　　　　　　　3 Sheets-Sheet 2
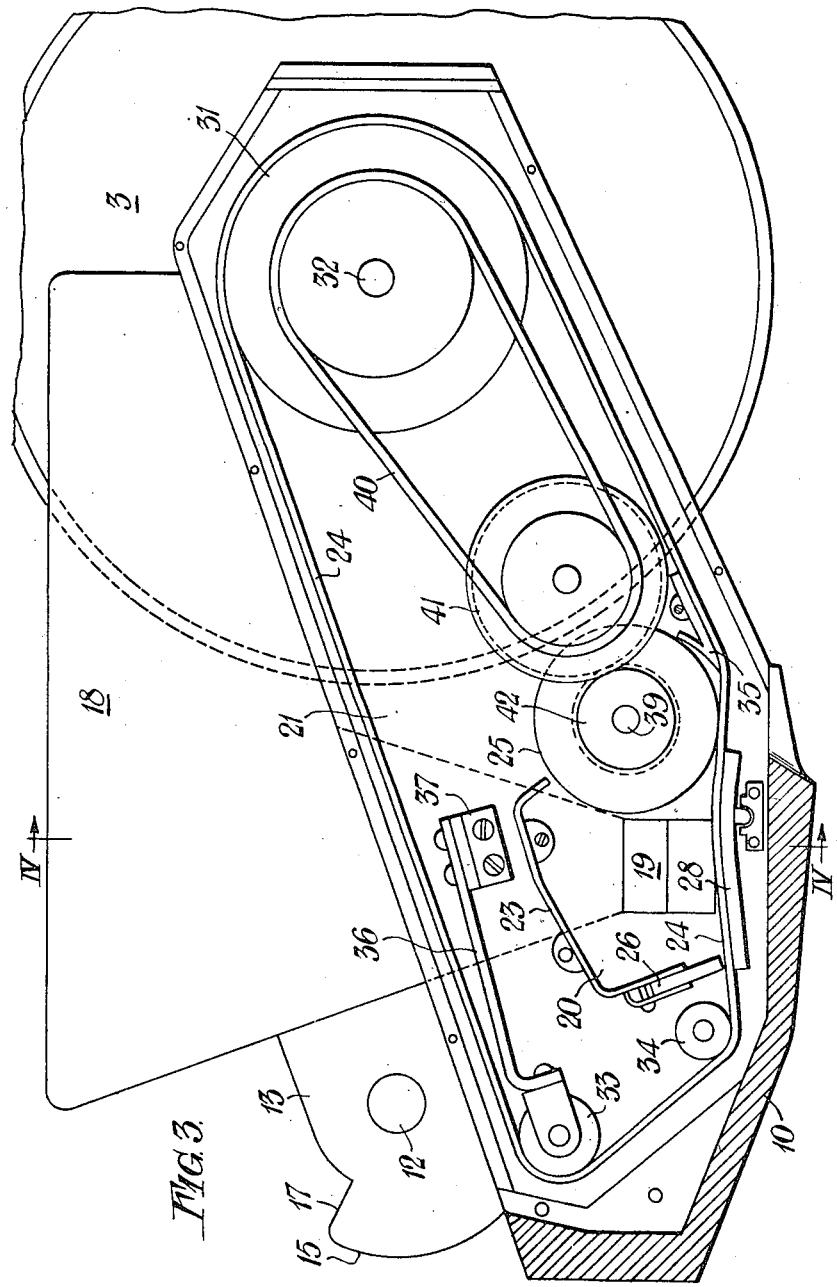
INVENTOR
Hugh Lambert Reilly
BY
Johnson and Kline
ATTORNEYS

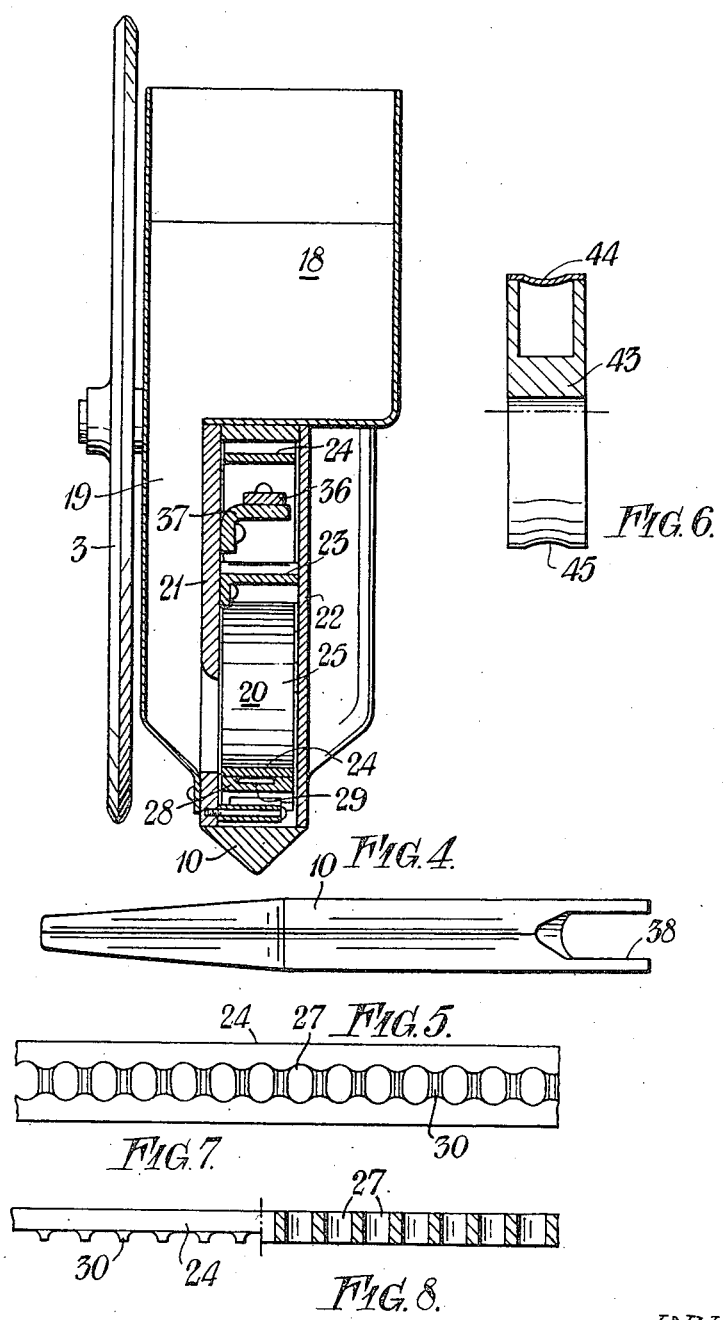

United States Patent Office 2,760,684
Patented Aug. 28, 1956

2,760,684

SEED SPACING DRILL

Hugh Lambert Reilly, Folkestone, Kent, England

Application April 2, 1952, Serial No. 280,013

Claims priority, application Great Britain April 13, 1951

5 Claims. (Cl. 222—177)

The present invention relates to mechanical seeders of the type adapted to sow seeds at regular predetermined intervals along a drill and has for an object to provide an improved construction of mechanical seeder of the type referred to.

Broadly the invention comprises a mechanical seeder having a seed conveyor moving through a seed chamber or hopper and adapted to convey the seeds to a discharge point to discharge the seeds from the seeder on to the ground at predetermined distances along the ground.

By varying the speed of the conveyor relative to the speed of travel of the seeder over the ground, the distance between seeds discharged from the seeder is also varied. The conveyor may take the form of a flexible belt, a rigid drum or a ring and is provided with means whereby as the conveyor moves through the seed chamber the seeds are removably retained at spaced intervals on the conveyor to be discharged therefrom at a suitable discharge point. The said means may be adapted to retain one or more seeds and may be provided at different spacing on the conveyor so that by providing a number of interchangeable conveyors having differently disposed seed retaining means the seeder is readily adapted for use in planting different types of seeds. Thus for example the conveyor may be adapted to convey single seeds and discharge them at short distances along the ground, or it may convey the seeds in groups of two or more seeds and discharge them at relatively long distances along the ground.

In a preferred form of the invention, the conveyor comprises a flexible endless belt, for example a rubber belt, along the length of which are formed a series of apertures or cells each of which is of a size suitable to accommodate the desired number of seeds of the particular type of seed to be sown.

The belt is caused to move through the lower part of a seed chamber which is fed from a hopper so that the cells become charged with seeds, the cells being closed at the lower end by a base plate upon which the belt rests. The base plate is slightly arched so that the belt bears upon it firmly throughout its length and is pivotally supported so as to conform to movement of the belt due to irregularity of the seed flow.

The belt may be of a thickness such that the seed or seeds are wholly contained in the cell within the thickness of the belt, or alternatively the thickness of the belt may be reduced and the base plate provided with a longitudinal groove or recess so that the seeds protrude downwardly from the under surface of the belt and rest upon the base of the recess.

The belt enters the seed chamber through an aperture in the front wall thereof and the rear wall of the chamber comprises a moving surface which is caused to move in a direction opposed to the direction of movement of the belt. The said surface is adapted to lie above the upper surface of the belt with a minimum clearance so that any seeds on the belt which are not positioned in the cells are driven back by the oppositely moving surface, which must move at a linear speed not less than that of the conveyor. The rear wall is also used in conjunction with the belt movement to maintain a circulation of seeds in the seed chamber so that the relative velocity between the belt and the seeds on the belt is maintained at a low value.

The said surface may comprise the peripheral surface of a roller adapted to rotate in a direction opposite to the direction of the belt movement. Alternatively it may comprise a further endless rubber or like belt supported upon suitably positioned rollers and adapted to be driven in the opposite direction to the conveyor belt, or the conveyor belt itself may be passed over suitably positioned rollers so that the upper run of the belt constitutes the oppositely moving rear wall of the seed chamber.

For high speed precision seed sowing it is preferred to employ a roller to provide the oppositely moving surface and to gear the roller to the driving mechanism of the conveyor belt so that the surface moves at a speed greater than the speed of the conveyor belt. In practice a convenient peripheral speed at which to work the roller is twice the linear speed of the belt; this is sufficient to maintain a circulation of seeds in the chamber.

The invention will now be described with reference to the accompanying drawings illustrating a mechanical seeder adapted to be drawn by a tractor. In the drawings:

Figure 1 is a plan view of the seeder;

Figure 2 is a side elevation, one of the side supports of the seeder being broken away to show details of construction;

Figure 3 is a side elevation, drawn to a larger scale, of the hopper and seed distributing mechanism;

Figure 4 is a section taken along the line IV—IV of Figure 3;

Figure 5 is an underneath view of the nose or coulter of the seeder;

Figure 6 is an elevation, partly in section, of a detail of the mechanism;

Figure 7 is a plan view of a part of the conveyor belt; and

Figure 8 is a side elevation partly in section of the part of the conveyor belt.

Referring to Figures 1 and 2 of the drawings, the mechanical seeder comprises a seed distributing unit indicated generally at 1 supported at its forward end between a pair of side frames 2 and at its rear end by a ground engaging wheel 3. The unit 1 is pivotally and removably supported on the frames 2 in a manner to be hereinafter described, so that the wheel 3 which also constitutes the drive wheel for the seed distributing mechanism is pressed firmly into engagement with the ground by the weight of the unit 1. The side frames are rigidly connected by brace members or stretchers 4 and 5, and are pivotally secured at the forward end upon the tool bar 6 of a tractor. While only one seeder is shown in the drawings, it will be understood that a number of seeders may be similarly connected to the tool bar 6 in spaced relation with each other so that one tractor may draw for example eight seeders. The side frames are supported at the rear upon a roller 7.

Secured to the forward stretcher 4 by a downwardly extending support 8 is a furrow opener 9 adapted to form a furrow as the seeder is drawn over the ground. The unit 1 has secured at its forward end a combined nose portion and coulter 10 which is adapted to lie in the furrow and to smooth it, the seeds being discharged from the rear of the coulter in a manner to be hereinafter described. Thus the seeds are discharged in close proximity to the base of the furrow thus ensuring substantially uniform spacing of the seeds.

The rear stretcher 5 supports a smoother blade 11 which co-operates with the land wheel 3 to fill in the furrow after the seeds are deposited therein, and the sowing operation is completed by the roller 7 which consolidates the loose soil above the seeds.

The unit 1 is pivotally and removably supported between the side frames 2 by a shaft or spindle 12 secured in a projecting portion 13 of the unit and engaging at each end in a bracket 14 secured to each side frame 2. The brackets 14 are U shaped with the opening facing forwardly so that in order to remove the spindle 12 from the brackets it is necessary to move the unit 1 forwardly with respect to the side frames. Such movement however is normally prevented by the engagement of the arcuate front edge 15 of the portion 13 with a cross member 16 extending between the side frames. The edge 15 is cut away as at 17 so that by rotating the unit 1 anti-clockwise as viewed in Figure 2 until the member 16 is clear of the edge 15, the unit can then be moved forwardly to disengage the spindle 12 from the brackets 14 to permit the unit to be removed from the side frames 2.

Referring now to Figures 3 and 4, the seed distributing unit comprises a hopper 18 communicating by means of a chute 19 with a seed chamber 20. The chamber 20 lies between the walls 21 and 22 of a box like structure housing the seed distributing mechanism (in Figure 3 the wall 22 is shown removed in order to disclose details of the mechanism) and is bounded at the top and forward end by a partition member 23 secured to the wall 21, at the bottom by a conveyor belt 24 and at its rear end by a roller 25. The member 23 has secured thereto at its forward end a flexible extension 26 which may be of rubber for example and lightly engages the surface of the belt 24.

The belt 24 is an endless flexible belt of rubber for example and is formed with a series of perforations 27 (Figures 7 and 8) which form cells each adapted to receive a seed, the perforations being closed at the lower end while the belt is moving through the chamber 20 by a pivoted support 28 upon which the belt rests. The support 28 is formed with a longitudinally extending groove or recess 29 in which the seed rests; only the upper part of the seed is contained by the belt and consequently the seed drops away readily as soon as the belt has conveyed it to the end of the grooved base.

The perforations 27 are preferably slightly tapered inwardly from the outer surface of the belt to ensure that the seeds can drop freely through the perforations, and between adjacent perforations there are formed projections 30 of a length not exceeding the width of the recess 29 and of a height not greater than the depth of the recess thus ensuring that small as well as large seeds are drawn along by the belt.

The belt 24 is supported upon a drive wheel 31 secured to the spindle 32 of the ground wheel 3, a tension roller 33, an idler roller 34, and a shoe 35. The tension roller 33 is mounted upon the end of a spring arm 36 secured to a bracket 37 fixed to the wall 21. The spring arm is adapted to lie substantially parallel to the upper run of the belt 24 while the relative disposition of rollers 33 and 34 is made such that the belt leaves the roller 33 at an acute angle with respect to the belt approaching roller 33. In this manner, variations in belt tension due to stretching of the belt are substantially negligible.

From the mechanism so far described it will be apparent that as the seeder is drawn over the ground, rotation of the ground wheel 3 drives the belt 24 which is caused to travel through the seed chamber 20. Seeds are deposited in the cells 27 of the belt and are carried along by the belt supported upon the support 28. Upon reaching the rear end of the support 28 the seeds are free to drop from the cells and fall through a U-shaped opening 38 formed at the rear of the coulter 10.

In order to prevent any seed leaving the seed chamber other than those positioned in cells, the roller 25 is rotatably mounted upon a spindle 39 to provide a minimum clearance between the roller and the belt. The roller 25 hereinafter referred to as the repeller is driven in the opposite direction to the belt and at a faster speed than the belt so that any seeds resting on the belt or lying proud of the belt surface will be engaged by the roller 25 and driven upwardly and forwardly in the seed chamber; in this way a circulation of the seeds is maintained in the seed chamber.

The repeller is driven from the spindle 32 by means of a belt or chain 40 and gear wheels 41 and 42 which are adapted to give the desired speed to the repeller.

The peripheral surface of the repeller 25 is required resiliently to grip the seeds lying proud of the belt and to this end the repeller takes the form of a flanged wheel 43 (Figure 6) having a rubber strip 44 secured across the flanges. In this way a resilient yielding surface is provided which in practice is found to grip the seeds effectively. Improved results are obtained if the surface of the repeller is slightly concave and for this purpose the rubber strip 44 is applied to and secured to the flanges so as to be slightly dished as at 45.

What I claim is:

1. A speed spacing drill comprising a hopper, a seed chamber in communication with said hopper and extending lengthwise of the drill, a front wall and a rear wall to said seed chamber, an endless conveyor belt having spaced apertures along the length thereof and movable through said chamber from the front wall to the rear wall thereof and forming the base of the chamber, a support engaging the under surface of the belt moving through the chamber to close the said apertures, the said rear wall of the chamber comprising the periphery of a rotatable cylindrical member, and means for driving said belt and for rotating said cylindrical member in a direction opposed to the direction of movement of the belt through the chamber.

2. A seed spacing drill comprising a hopper, a seed chamber in communication with said hopper, an endless conveyor belt movable through said chamber and forming the base thereof, the said belt having spaced seed receiving apertures extending therethrough, an elongated support extending lengthwise of the belt passing through the chamber and engaging the under surface of the belt, a groove or channel extending longitudinally of the upper surface of said support below said apertures, and a downwardly extending projection on said belt adjacent the rear end, with respect to the direction of movement of the belt through the chamber, of each aperture and adapted to engage in the said groove or channel.

3. A seed spacing drill comprising a frame, a ground wheel therefor, a hopper supported on said frame, a seed chamber in communication with said hopper, an endless conveyor belt movable through said seed chamber and closing the base thereof, the said belt being provided with seed-receiving apertures spaced along the length thereof, said apertures extending completely through said belt so that seeds in said apertures may drop through the belt, a support extending longitudinally of the belt and yieldingly engaging beneath the belt passing through the chamber and serving as a bottom closure for said apertures, and means operatively connecting said belt to said ground wheel for effecting movement of the belt through the chamber to convey seed contained in the said apertures from the chamber to a discharge point, said seeds dropping through said apertures in said belt at said discharge point.

4. A seed spacing drill comprising a hopper, a laterally extending passage leading from the hopper to a seed chamber, an endless conveyor belt extending lengthwise of the drill and having an upper run and a lower run, said lower run forming the base of the chamber, the said belt having seed-receiving apertures spaced along the length thereof, said apertures extending completely through said belt so that seeds in said apertures may drop through the belt, a support extending lengthwise of the said lower run and yieldingly engaging the under surface of the belt where the lower run forms the base of the seed chamber to form a closure for the apertures whereby seed entering the apertures is retained in the apertures to be conveyed from the chamber by movement of the belt and to be released from the apertures by dropping therethrough at a discharge point determined by the length of said support.

5. A seed spacing drill as claimed in claim 1, wherein said cylindrical member is rotated at a speed such that its peripheral velocity is greater than the linear speed of the belt.

References Cited in the file of this patent

UNITED STATES PATENTS

| | | |
|---|---|---|
| 21,273 | Keiper et al. | Aug. 24, 1858 |
| 356,450 | Coleman | Jan. 25, 1887 |
| 467,683 | Essex | Jan. 26, 1892 |
| 1,230,350 | Waters | June 19, 1917 |
| 1,761,065 | Bausman | June 3, 1931 |
| 1,902,924 | Wamhoff et al. | Mar. 28, 1933 |
| 2,605,023 | Ward | July 29, 1952 |